Inventors:
Victor James Cooper and
Norman Neville Parker Smith
By their attorneys
Baldwin & Wight Sept. 21, 1954 V. J. COOPER ET AL 2,689,886

STABILIZATION CIRCUIT FOR THERMIONIC VALVE AMPLIFIERS, MODULATORS, AND REPEATERS

Filed April 5, 1951 3 Sheets-Sheet 2

Inventors:
Victor James Cooper and
Norman Neville Parker Smith
By their attorneys:
Baldwin & Wight Sept. 21, 1954 V. J. COOPER ET AL 2,689,886

STABILIZATION CIRCUIT FOR THERMIONIC VALVE AMPLIFIERS, MODULATORS, AND REPEATERS

Filed April 5, 1951 3 Sheets-Sheet 3

Inventors:
Victor James Cooper and
Norman Neville Parker Smith,
By their attorneys,
Baldwin & Wight Patented Sept. 21, 1954 2,689,886

UNITED STATES PATENT OFFICE 2,689,886

STABILIZATION CIRCUIT FOR THERMIONIC VALVE AMPLIFIERS, MODULATORS, AND REPEATERS

Victor James Cooper, Writtle, and Norman Neville Parker Smith, Chelmsford, England, assignors to Marconi's Wireless Telegraph Company Limited, London, England, a company of Great Britain Application April 5, 1951, Serial No. 219,452

Claims priority, application Great Britain May 18, 1950

2 Claims. (Cl. 179—171)

This invention relates to thermionic valve amplifiers, modulators and repeaters and has for its object to provide improved and simplified means for securing stabilization of the level of output signals from an amplifier, modulator or repeater despite fluctuations of current therethrough and/or variation of high tension supply voltage thereto.

The invention, though of general application, is particularly well suited to and primarily intended for television amplifier and modulator circuit arrangements. In such arrangements it is commonly required to maintain a predetermined "black level" in the television waveform at the output terminals despite possible drift of high tension supply voltage and the present invention provides simple and reliable means for securing this result.

According to this invention stabilization of the output signal level from an amplifier repeater or modulator is effected by a stabilizing circuit which is in parallel with the high tension supply source for said amplifier, repeater or modulator and comprises two valves in series and connected together through an impedance, with the anode of the more negative valve coupled to the control grid of the other valve and an amplifier or D. C. source included in the control grid circuit of the more negative valve, the cathode of the more positive valve being connected to one output terminal of the amplifier repeater or modulator to maintain it at a desired predetermined potential.

If desired, the valves in the stabilizing circuit may be cross coupled as respects their anodes and control grids i. e. the anode of each may be coupled to the control grid of the other.

Figure 3:
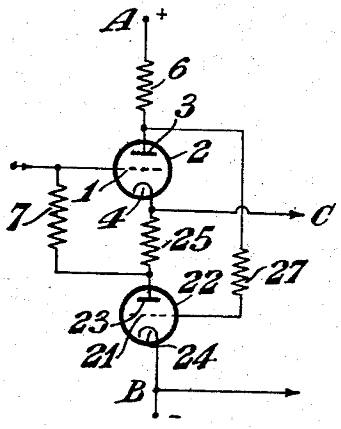
Figure 4:
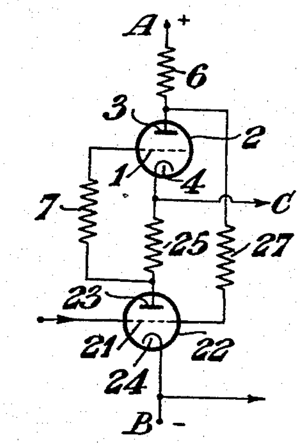
Figure 5:
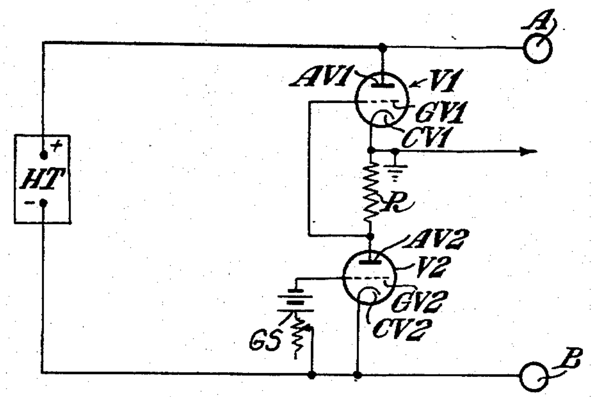
Figure 6:
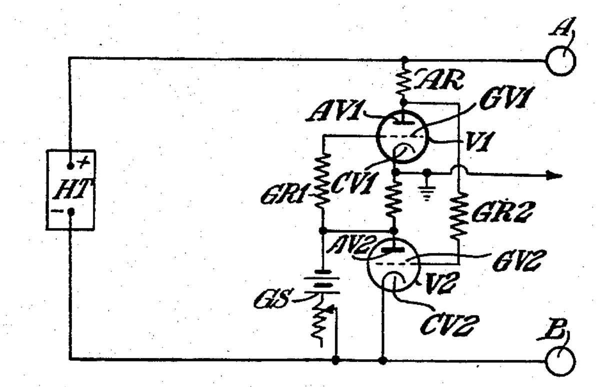
Figure 5A:
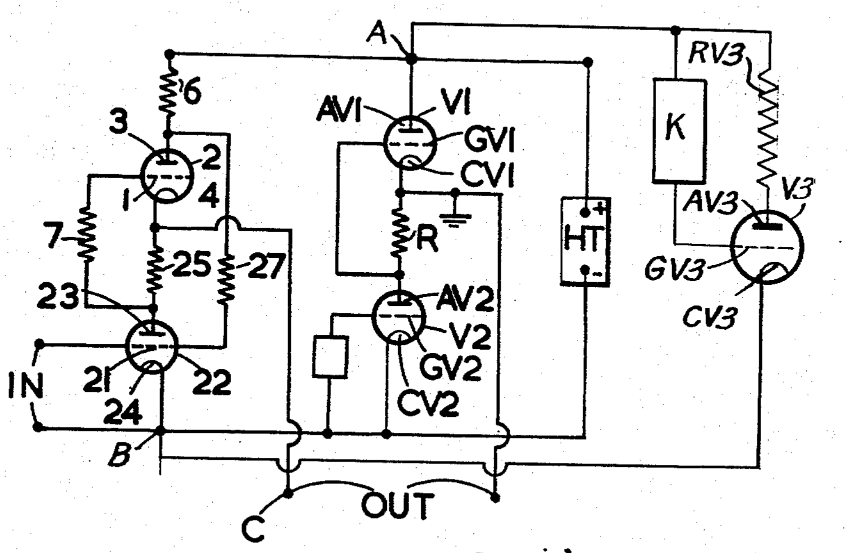
Figure 7:
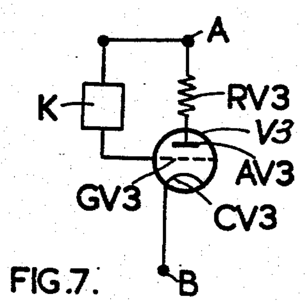

The invention is illustrated in and further explained in connection with the accompanying diagrammatic drawings of which Figs. 1 to 4 show typical amplifiers, not per se forming part of the invention, to which the said invention may be applied and Figs. 5*a*, 6 and 7 illustrate embodiments of the said invention. In Figs. 5 and 6 the lettered terminals A and B correspond to the similarly lettered terminals in Figs. 1 to 4.

The invention may be applied to any of a wide variety of different forms of amplifiers, modulators and repeaters but, in order to shorten description, four forms will first be described and illustrated in Figs. 1 to 4, and certain terminals, common to all those forms defined. The manner in which a stabilizing circuit in accordance with this invention may be associated with any of the said forms will then be illustrated in Figs. 5 and 6 and described with reference to the defined terminals.

Figure 1:
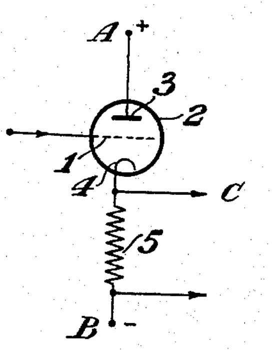

The first form is illustrated in Fig. 1. Here input is applied to the control grid 1 of a valve 2 whose anode 3 is connected to high tension positive and whose cathode 4 is connected through an output resistance 5 to high tension negative, output being taken from across this resistance. In this form the anode may be termed the "positive terminal" A, the end of the output resistance remote from the cathode, the "negative terminal" B and the cathode the "live output terminal" C.

Figure 2:
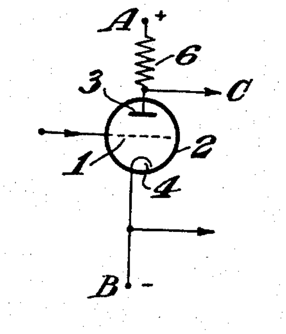

In the second form, illustrated in Fig. 2, input is applied to the control grid 1 of a valve 2 whose anode 3 is connected to high tension positive through an anode resistance 6 and whose cathode 4 is connected to high tension negative, output being taken from between anode and cathode. In this form the positive terminal A is the high tension end of the anode resistance, the negative terminal B is the cathode and the live output terminal C is the anode.

In the third form, which is illustrated in Fig. 3, there are two valves 2 and 22, in series. Of these the valve 2 has its anode 3 connected to high tension positive through an anode resistance 6 and its cathode 4 connected to the anode 23 of the valve 22 through a resistance 25, the cathode 24 of said valve 22 being connected to high tension negative. Input is applied to the control grid of said valve 2 and the said control grid is connected through a resistance 7 to the anode 22, a similar cross connection including resistance 27 being provided between the anode 3 of valve 2 and the control grid 21 of valve 22. Output is taken from between the two cathodes and the terminals A, B and C are, respectively, the end of resistance 6 remote from anode 3, the cathode 24 and the cathode 4.

In the fourth form, which is illustrated in Fig. 4 and is a variant of the third, input is applied to the control grid 21 of the more negative valve 22 instead of to the control grid 1 of the more positive valve 2. In other respects Figs. 3 and 4 are alike and in both the positive terminal A is the high tension end of the anode resistance 6, the negative terminal B is the cathode 24 of the more negative valve 22 and the live output C is the cathode 4 of the more positive valve 2.

There are, of course, numerous other circuits with equivalent positive, negative, and live output terminals.

In the embodiment of the invention shown in Fig. 5 the positive terminal A of an amplifier (not shown) whose output is to be stabilized is connected to the positive terminal of a high tension source H. T. and the negative terminal B is connected to high tension negative and between these two terminals is connected a stabilizing circuit comprising two valves in series. The first valve V1 has its anode AV1 connected to the positive terminal. The control grid GV1 of valve V1 is connected to the anode AV2 of the second valve V2 and the cathode CV1 of said valve V1 is connected through a resistance R to the said anode AV2. The control grid GV2 of the valve V2 is connected to the cathode CV2 thereof through an amplifier connected to amplify the same signals as are applied to the control grid 21 shown in Figs. 4 and 5*a* or, more simply, a source GS of D. C. potential and the said cathode CV2 is connected to the negative terminal B. The cathode CV1 of the valve V1 is earthed and constitutes one of the two output terminals of which the other is the live output terminal C, which does not appear in Fig. 5. Fig. 5*a* shows clearly the way in which the circuits of Figs. 4 and 5 are connected to one another the said Fig. 5*a* being in fact a single figure incorporating both circuits. As the same number references are used in Figs. 4, 5 and 5*a*, for the same parts, further description of Fig. 5*a* is unnecessary beyond the statement that input is applied at IN and output is taken off at OUT.

As will be appreciated the stabilizing circuit between the positive and negative terminals A and B establishes the voltage to earth of the live output terminal C and maintains it with a high degree of accuracy at a required value despite possible fluctuations of current flow through the amplifier whose output is to be stabilized.

In the modification shown in Fig. 6 the anode AV1 of the valve V1 in the stabilizing circuit is connected to the positive terminal A through a resistance AR and the control grid of each of the said two valves is connected to the anode of the other through a resistance GR1 or GR2. In other respects the arrangement is as already described.

Where a very high degree of stabilization is required an additional stabilizing circuit may be provided to compensate for supply voltage fluctuations. Such an additional circuit is shown in Fig. 7. The ends of this additional circuit are marked A and B in Fig. 7 to indicate that they may be connected at the points A and B, respectively, of any of Figs. 5, 5*a* and 6. The said additional circuit thus shunted between the positive and negative terminals A and B consists of an additional valve V3 having its anode AV3 connected to the positive terminal A through a resistance RV3 and its cathode CV3 connected to the negative terminal B, an amplifier K being connected between terminals A and B at its input and between the control grid GV3 of the valve V3 and terminal B at its output. The amplifier K thus applies to said control grid GV3 of the valve V3 voltage variations dependent on changes of potential which may occur at terminals A and B and thereby compensate for such changes. Amplifier K is illustrated as a block. The two stabilizing circuits in combination, gives an exceedingly stable output level at the output circuit indicated by the word "OUT" in Fig. 5*a* for example, virtually completely independent of normal signal amplitude and supply variations and is, from the practical point of view, much simpler than those known and widely used stabilizing arrangements which require constant impedance filter networks in the high tension supply systems and often, also, a multiplicity of supplies. Fig. 5*a* shows the manner in which the amplifier K and the third valve V3 float across the terminals A and B of the electron tube system with the anode circuit extending from anode AV3 so loaded by resistance RV3 and the variable impedance offered by valve V3 that changes in potential on grid GV3 control the impedance of the cathode anode circuit CV3—AV3 which in coaction with resistance RV3 compensates for voltage fluctuations across points A and B of the electron tube system and stabilizes the operation of the system. The valve V3 and resistance RV3 constitute a second electronic means for stabilizing the circuits of valves V1 and V2. We make use of the variable impedance characteristic of valve V3, such as recognized by Chester W. Rice in United States Patent 1,501,726 of July 15, 1924.

Where variation of the datum output level is required—for example, in the case of a television amplifier, variation of the "black" level—this may be provided by making provision for variation of the direct current into the more negative valve V2 of the two which are in series in the main stabilizing circuit, that is, by making GS variable as indicated in Figs. 5 and 6.

In the preceding description and in the drawings it has been assumed, for the sake of simplicity, that all the valves are triodes but, obviously, other suitable valves e. g. pentodes may be used. Further any valve may be replaced by a bank of valves in parallel. Moreover, in the said description, only those circuits necessary to an understanding of this invention have been referred to, description of normal bias and similar circuit details being omitted as well known per se.

We claim:

1. In combination in a thermionic valve signal circuit arrangement, a valve amplifier including at least a cathode, a control grid and an anode, said amplifier having a positive terminal, a negative terminal and a live output terminal with at least one signal controlled electron discharge space in a series circuit with a fixed impedance between said positive terminal and said negative terminal, said live output terminal being connected to a point on said series circuit between said positive terminal and said negative terminal, an input circuit connected between said control grid and the negative terminal of said amplifier, a high tension supply source connected between said positive terminal and said negative terminal and, in parallel with said source, for stabilizing the output signal level, a stabilizing circuit comprising two valves each including at least a cathode, a control grid and an anode, said valves being arranged in series and connected together through an impedance, with the anode of the more negative valve coupled to the control grid circuit of the other valve, the cathode of the more positive valve being grounded, a D. C. source disposed in the control grid and cathode circuit of the more negative valve, the cathode of said more negative valve and the cathode of said first mentioned valve amplifier being directly connected to the negative terminal of said source and free of cathode coupling with any of the aforesaid circuits, and an electronically controllable second stabilizing circuit connected in parallel with the aforesaid stabilizing circuit, the output terminals of the whole combination being constituted by the cathode of the more positive valve and the said live output terminal.

2. Apparatus as set forth in claim 1 and wherein said second electronically controllable stabilizing circuit comprises a third valve having at least a cathode, a control grid and an anode with a resistance in series with its anode, said resistance being also connected with the anode of the more positive valve.

References Cited in the file of this patent

UNITED STATES PATENTS

| Number | Name | Date |
|---|---|---|
| 2,329,073 | Mitchell | Sept. 7, 1943 |
| 2,424,893 | Mansford | July 29, 1947 |
| 2,631,198 | Parisoe | Mar. 10, 1953 |

FOREIGN PATENTS

| Number | Country | Date |
|---|---|---|
| 565,870 | Great Britain | Dec. 1, 1944 |